US008432789B2

(12) United States Patent
Zhang (10) Patent No.: US 8,432,789 B2
(45) Date of Patent: Apr. 30, 2013

(54) SPLIT MULTI-LINK TRUNKING (SMLT) HOLD-DOWN TIMER FOR INTERNET PROTOCOL (IP) MULTICAST

(75) Inventor: Debin Zhang, Littleton, MA (US)

(73) Assignee: Avaya Inc., Basking Ridge, NJ (US)

( * ) Notice: Subject to any disclaimer, the term of this patent is extended or adjusted under 35 U.S.C. 154(b) by 318 days.

(21) Appl. No.: 12/979,586

(22) Filed: Dec. 28, 2010

(65) Prior Publication Data

US 2012/0163162 A1    Jun. 28, 2012

(51) Int. Cl.
G06F 11/00 (2006.01)
G08C 15/00 (2006.01)

(52) U.S. Cl.
USPC .......................... 370/218; 370/216; 370/217

(58) Field of Classification Search .................. 370/216, 370/217, 218
See application file for complete search history.

(56) References Cited

U.S. PATENT DOCUMENTS

2010/0189106 A1 * 7/2010 Azimi et al. .................. 370/390
2012/0106523 A1 * 5/2012 Anumala et al. ............. 370/338
2012/0110393 A1 * 5/2012 Shieh et al. .................... 714/48

* cited by examiner

Primary Examiner — Kenny Lin
(74) Attorney, Agent, or Firm — Anderson Gorecki & Rouille LLP (57) ABSTRACT

A method, apparatus and computer program product for providing mulitcast failover and recovery which minimizes lost packets is presented. A first network device returns to a fully active state and starts a multicast hold-down timer. A first message is sent to a second network device, the message indicating at least one Split Multi Link Trunk (SMLT) Virtual Local Area Network (VLAN) Identifier (ID) correlating to the multicast hold-down timer. The first network device receives an acknowledgment of said first message and Layer 2 forwards multicast data traffic to said second network device until the timer expires, whereupon the first device is capable of handling its own multicast data traffic, and then has Layer 2 bridging turned off and enables IP multicast routing. During the period of multicast hold-down timer, the second device will perform IP multicast forwarding on behalf of the first device.

20 Claims, 11 Drawing Sheets

SPLIT MULTI-LINK TRUNKING (SMLT) HOLD-DOWN TIMER FOR INTERNET PROTOCOL (IP) MULTICAST

BACKGROUND

Data communication networks may include various computers, servers, nodes, routers, switches, hubs, proxies, and other devices coupled to and configured to pass data to one another. These devices are referred to herein as "network devices," and may provide a variety of network resources on a network. Data is communicated through data communication networks by passing protocol data units (such as packets, cells, frames, or segments) between the network devices over communication links on the network. A particular protocol data unit may be handled by multiple network devices and cross multiple communication links as it travels between its source and its destination over the network. Hosts such as computers, telephones, cellular telephones, Personal Digital Assistants, and other types of consumer electronics connect to and transmit/receive data over the communication network and, hence, are users of the communication services offered by the communication network.

Network switches (e.g. Access Points, Mobility Switches and Edge Switches) are typically implemented to have a control plane that controls operation of the network element and a data plane that handles traffic flowing through the network. The data plane typically will have a collection of line cards having ports that connect to links on the network. Data is received at a particular port, switched within the data plane, and output at one or more other ports onto other links on the network. To enable the data to be handled quickly, the data plane is typically implemented in hardware so that all of the decisions as to how to handle the data are performed using hardware lookups, etc. The packets are transferred across the network in accordance with a particular protocol, such as the Internet Protocol (IP).

Ports can fail for many reasons, including line card failure, failure of the link connected to the port (e.g. line cut), far-end line card failure, etc. Likewise, the internal forwarding datapath within the network element may fail which may cause a port or set of ports to appear to have failed, or there may be some other failures along the logical/virtual connection to the port's external peer endpoint. There are numerous reasons why a port may fail.

In the event a port fails, traffic flowing through the port should be diverted to flow out an alternate port to enable connectivity to be restored through the network. To minimize impact on the traffic being handled by the network element, e.g. to minimize downtime and packet loss, the quicker the rerouting of traffic can occur the better. Preferably, it would be advantageous to enable the traffic to fail over to an alternate port in under ten milliseconds (ms). Preferably, the traffic should be spread across the remaining ports rather than all moved from the failing port to a particular designated alternate port to prevent the designated alternate port from being overloaded with traffic.

Over time, the manner in which network elements handle data has evolved. For example, two or more physical links may extend between a group of network elements and be used collectively as a multi-link trunk (MLT). When the links of an MLT are physically connected to two different network elements, the MLT is referred to as a Split Multi-Link Trunk (SMLT).

As noted above, depending on the manner in which the network elements are interconnected, there may be many ways for the network element to forward a frame/packet to enable the frame/packet to reach its destination. As used herein, the term "cluster" is used to refer to one or more nodes providing node-level resiliency at the network level. Logical connections between the cluster nodes are referred to herein as Inter-Switch Trunks (ISTs). ISTs may be physical links that extend from one network element to a neighboring network element in the cluster, or may be logical links that tunnel through one or more intermediate network elements within the cluster. The node that receives a packet will be referred to as a local node. All other nodes within the cluster are referred to as remote nodes with respect to the received packet.

Two or more links may be grouped to form a Multi-Link Trunk (MLT). Each MLT will be assigned a MLT group ID (MLT-ID), which is a global value within the cluster and unique across the cluster nodes. An MLT with all its port members only on the local node is referred to as a local MLT group. An MLT group with some of its port members on the local node and the rest on one or more of the remote nodes is referred to as a Split MLT or SMLT group.

When a logical port is implemented as a MLT or SMLT, there are actually multiple physical ports that are capable of forwarding a packet to its next hop on the network. Accordingly, if one of the ports of a MLT/SMLT fails, it would be advantageous to cause the packet to be forwarded on one of the remaining ports so that the packet can traverse the network rather than being dropped. Likewise, rather than designate a primary and backup port for each port in the SMLT, it would be advantageous to load share the packets across the remaining ports of the MLT/SMLT so that the packets may be distributed across the remaining ports that are UP. According to an embodiment, this process is implemented in hardware so that the fastpath (data plane) can automatically accommodate individual and multiple port failures and automatically redirect packet traffic across the remaining ports in an equitable manner.

SUMMARY

SMLT is a widely deployed network topology. With this technology, users can achieve sub-second failover now for IP unicast traffic. However, the current SMLT technique cannot reach the same failover efficiency for IP multicast traffic. The existing RSMLT solution has hold-down timer for the failover SMLT switch that allows unicast routing traffic to be forwarded to RSMLT peer before routing protocols are fully convergent on failover switch. During that period of time, RSMLT peer will take the forwarding responsibility on behalf of the failover switch, so that traffic loss during failover is avoided, but that technique only applies to IP unicast traffic. The proposed invention will address the IP multicast case.

Conventional mechanisms such as those explained above suffer from a variety of deficiencies. One such deficiency associated with the IP multicast SMLT failover scenario, is that the existing solution is to turn on IP multicast routing immediately once the failover switch comes back. It will take significant time for the failover switch to get all multicast routes populated. Before both unicast and multicast protocols get convergent, traffic loss will be seen.

Embodiments of the invention significantly overcome such deficiencies and provide mechanisms and techniques that provide sub-second IP multicast traffic failover and recovery in an SMLT environment.

In a particular embodiment of a method for providing IP multicast traffic failover and recovery in an SMLT environment, the method includes returning, by a first network device, to a fully active state and starting, by the first network device, a timer. The method further includes sending, by the first network device to a second network device, a first message indicating SMLT VLAN IDs correlating to the timer, wherein the second network device is a peer to the first network device, and wherein the first network device and the second network device are in a SMLT relationship. Additionally the method includes forwarding, by the first network device, multicast data traffic to the second network device. The first network device learns multicast routes while the timer is active. The method additionally includes, upon the timer expiring, the first network device enables multicast routing for the SMLT VLAN IDs.

Other embodiments include a computer readable medium having computer readable code thereon for providing IP multicast traffic failover and recovery in an SMLT environment. The computer readable medium includes instructions for returning, by a first network device, to a fully active state and starting, by the first network device, a timer. The computer readable medium further includes instructions for sending, by the first network device to a second network device, a first message indicating SMLT VLAN IDs correlating to the timer, wherein the second network device is a peer to the first network device, and wherein the first network device and the second network device are in a SMLT relationship. Additionally the computer readable medium includes instructions for Layer 2 forwarding, by the first network device, multicast data traffic to the second network device during the period indicated by the timer. The first network device learns multicast routes while the timer is active. The computer readable medium additionally includes instructions for, upon the timer expiring, the first network device enables multicast routing on the VLANs indicated by the SMLT VLAN IDs.

Still other embodiments include a network device, configured to process all the method operations disclosed herein as embodiments of the invention. In such embodiments, the network device includes a memory system, a processor, communications interface in an interconnection mechanism connecting these components. The memory system is encoded with a process that provides IP multicast traffic failover and recovery in an SMLT environment as explained herein that when performed (e.g. when executing) on the processor, operates as explained herein within the network device to perform all of the method embodiments and operations explained herein as embodiments of the invention. Thus any network device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing IP multicast traffic failover and recovery in an SMLT environment as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
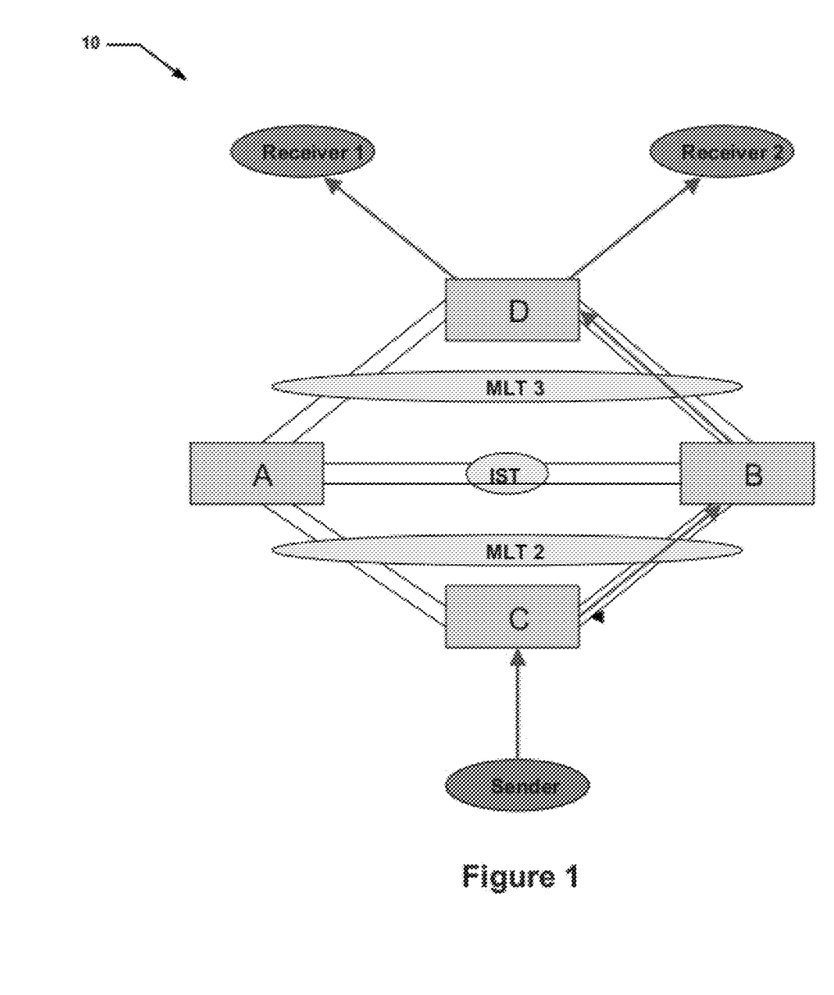
FIG. 1 shows an SMLT environment in accordance with embodiments of the invention.
Figure 2:
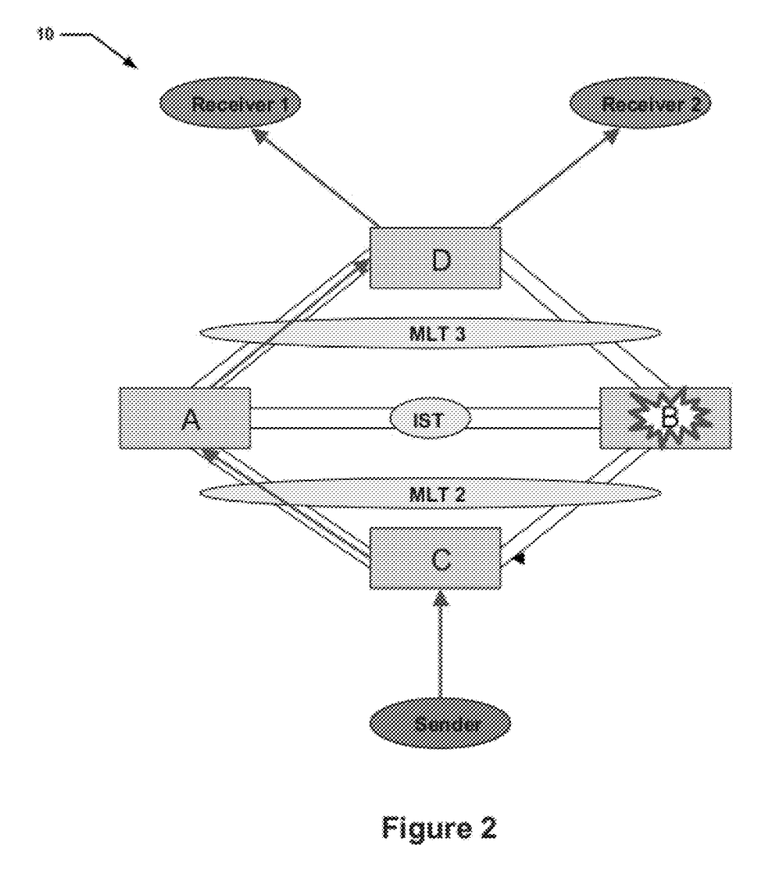
FIG. 2 shows the SMLT environment of FIG. 1 wherein Router B has crashed.

FIG. 1 shows a typical diamond SMLT network deployment 10. Nodes A, B, C, and D are multicast capable routers. Router C is a SMLT edge box, which connects to two SMLT peer boxes via a MLT connection. An algorithm, most likely a hashing algorithm, running on router C determines which MLT link it will take to send multicast traffic out to receivers. For example, router C picks the link between C and B to send multicast traffic to receiver via router B (traffic flow is shown in FIG. 1). If router B crashes, router C has no option but to send traffic to router A. This transition can be done within sub-seconds (traffic flow under this condition is shown in FIG. 2). The problem happens when route B comes back to an active state. After router B reboots and comes alive, router C will detect the link between C and B is up. MLT hashing algorithm on router C may switch traffic outgoing interface from the link to Router A to the link towards Router B. But it may take a long time for router B to reprogram multicast (S, G) routes. Before the multicast routes become available, all the multicast packets hitting router B will be dropped. This causes traffic loss and longer failover time.

In the above scenario, there are several reasons why router B may take a long time to reprogram (S, G) multicast routes. Multicast routes depend on unicast routes. Until unicast routing protocols are convergent, multicast route programming won't complete. Many routing protocols, such as Open Shortest Path First (OSPF) or Border Gateway Protocol (BGP), may take long time to converge. As a result, multicast routes won't be established within short period of time. Such delay becomes more severe in a scaled network, where more router neighbor adjacency needs to build up, and larger numbers of routes need to be exchanged and reprogrammed. The sending of PIM (S, G) join messages is normally triggered by PIM timers. Therefore, the availability of multicast (S, G) routes depends on when PIM timer expiries. During router reboots, the system normally is very busy. There are many events that the system needs to handle, such as configuring hardware devices and starting routing protocols; it may take a longer time for multicast routing protocols to get CPU time to program multicast routes.

Due to the above reasons, multicast packets may get lost for considerable period of time in the above scenario. The present method and apparatus providing IP multicast traffic failover and recovery addresses these issues in order to achieve sub-second failover for IP multicast traffic in SMLT environment.

One problem that this invention is addressing is that after the SMLT peer reboots, there is a period of black hole duration, in which IP multicast traffic may get lost due to the unavailability of multicast routes. The present invention fixes the above issue, and makes sub-second failover possible for IP multicast traffic in SMLT environment.

Referring back to FIG. 1 to illustrate how this technique works, both node A and B are IP multicast enabled routers. Router C may have IP multicast turned on. It may also simply be a layer 2 switch. Multicast traffic senders are connected to node C. Router A and B are connected by Inter-Switch Trunk (IST) link. Router D is another IP multicast enabled router, which has multicast receivers connected to it, either directly or indirectly through a network cloud. SMLT is configured among nodes A, B, C, and D.

Figure 3:
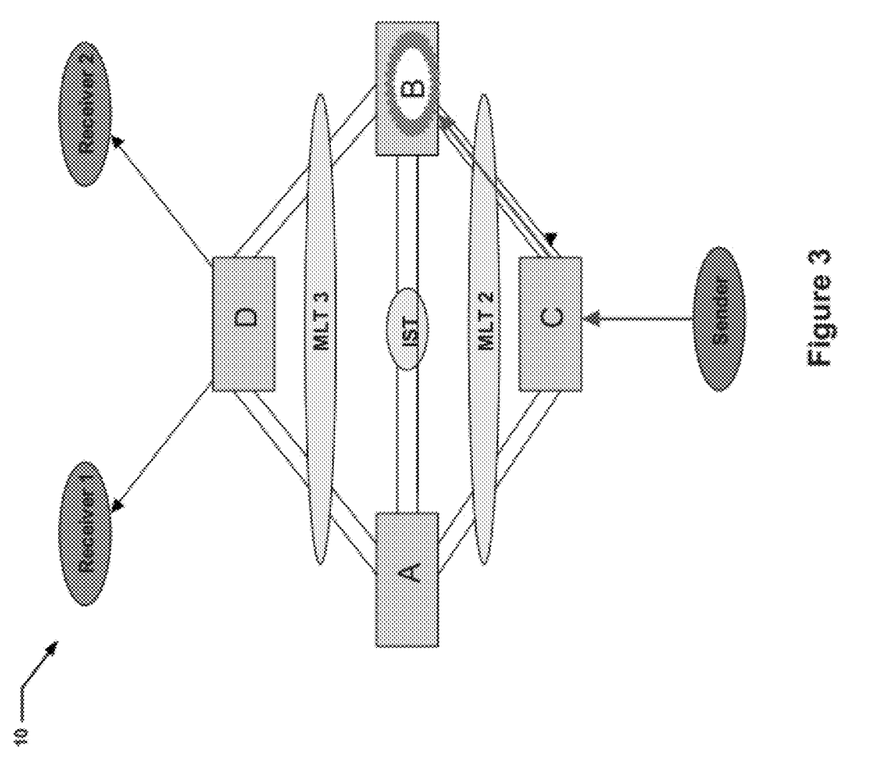
FIG. 3 shows the SMLT environment of FIG. 1 wherein Router B has recovered but multicast routes are not yet available.
Figure 4:
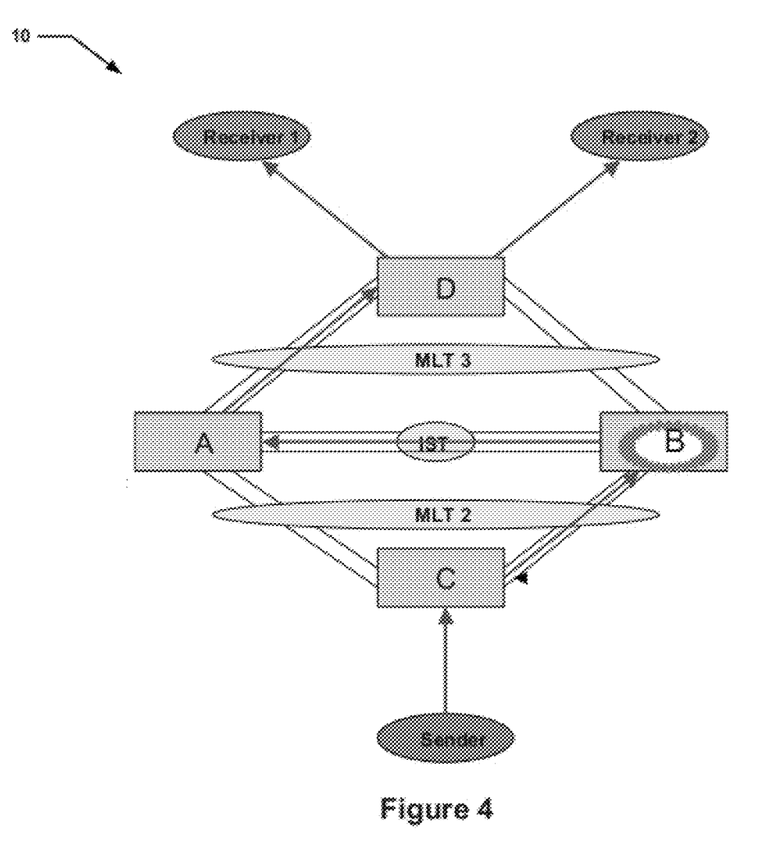
FIG. 4 shows the SMLT environment of FIG. 1 wherein Router B has recovered and multicast traffic is forwarded to the SMLT peer before MULITCAST HOLD DOWN timer expires.

Under normal conditions, multicast traffic flows smoothly from senders to receivers via the above SMLT connection as shown in FIG. 1. The present invention takes effect when one of the two SMLT peers switches failsover. Referring to FIGS. 2 and 3, router B has failed. After router B comes back from reboot, IP multicast routes won't be available immediately. To avoid traffic loss, IP multicast on router B won't be turned on immediately. Instead, router B starts an IP multicast hold-down timer. Before this timer expires, router B won't perform Layer 3 IP multicast routing. Instead, router B will conduct layer 2 forwarding; so that all IP multicast traffic received on SMLT link on router B, which is the link between Router B and C, will be layer 2 forwarded to its SMLT peer (router A) via the IST link. Because router B's SMLT peer router A is always in normal forwarding condition, it has all the IP multicast routes available. Therefore, router A is capable to forwarding all the IP multicast traffic to their destination. FIG. 4 shows the multicast traffic flow before Router B's IP multicast hold-down timer expires.

After router B comes back from failover, once it detects its IST link is up, router B starts its IP multicast hold-down timer. The IST link needs to come up earlier than SMLT link, which is the link between Router B and C. Before Router B's SMLT link is up, Router C sends all traffic to Router A. There is no multicast traffic hitting router B from SMLT link before IP multicast hold-down timer starts. As a result there is no traffic loss before IP multicast hold-down timer fires up. The duration for the IP multicast hold-down timer can be pre-configured. It can also be turned off dynamically based on router B's multicast routing readiness.

Figure 5:
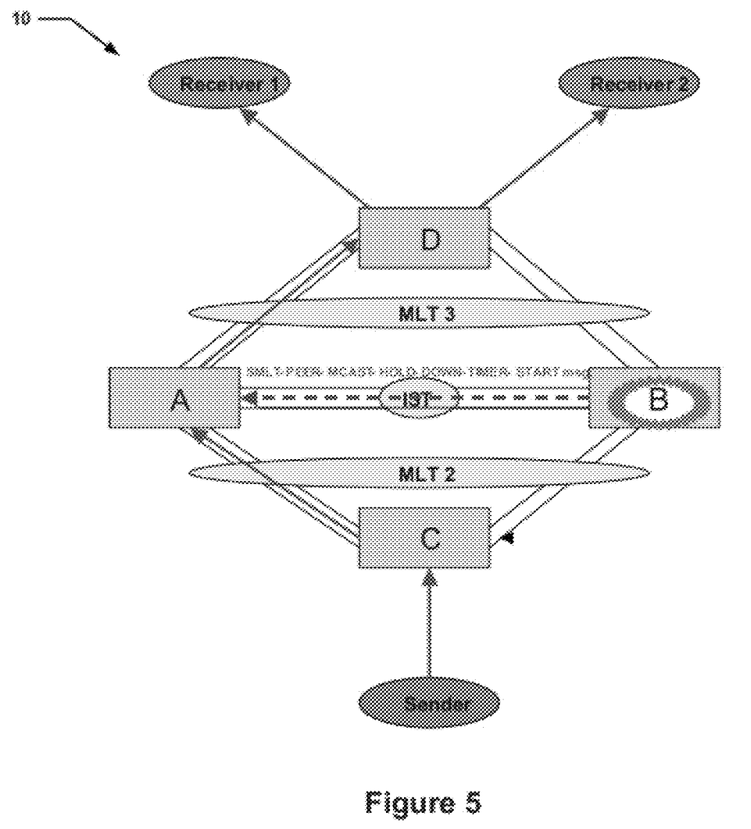
FIG. 5 shows an SMLT environment in accordance wherein Router B sends a timer start message to its peer.

Once router B starts its IP multicast hold-down timer, it sends an SMLT-PEER-MCAST-HOLD-DOWN-TIMER-START message to its SMLT peer (router A in the example) via IST link. This message contains SMLT VLAN IDs, on which SMLT multicast hold-down timer will be turned on. These VLANs can be configured by user. By default, multicast hold-down timer will be enabled on all SMLT VLANs. FIG. 5 shows this step.

IP multicast routes are specified as (S, G, M) tuple, where S and G mean multicast source and destination group respectively, and M indicates multicast packet's incoming interface. In SMLT environment, each multicast route that has SMLT link as incoming interface also has a corresponding routing record (S, G, M'). Here M' indicates the IST interface. The (S, G, M') routing records are used to handle the multicast packets coming from IST link. Under normal condition, for the (S, G, M') routing record, SMLT link between router A and D will be excluded from multicast outgoing interface list to avoid duplicate multicast packets sent to receivers. That interface is only added to multicast outgoing interface list when SMLT link between B and C is down. With this proposed solution, upon receiving the SMLT-PEER-MCAST-HOLD-DOWN-TIMER-START message from router B, router A will modify its IP multicast routes, so that for all the (S, G, M') routing records, SMLT link between router A and D will be added to multicast outgoing interface list. Here M' is the IST interfaces for each SMLT VLAN specified in SMLT-PEER-MCAST-HOLD-DOWN-TIMER-START message. This will enable router A to forward the IP multicast traffic from router B to their destination.

Figure 6:
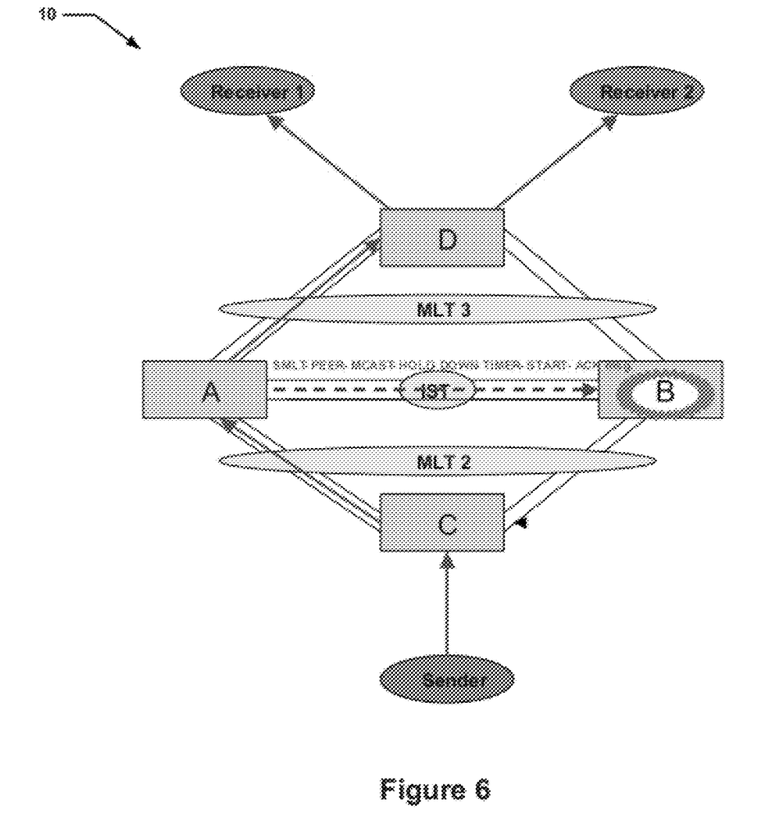
FIG. 6 shows the SMLT environment of FIG. 5 wherein Router B has received an acknowledgement for the timer start message from its SMLT peer.

After modifying its IP multicast routing records, router A sends back a SMLT-PEER-MCAST-HOLD-DOWN-TIMER-START-ACK message back to router B. FIG. 6 shows this step. Upon receiving this ACK message, router B will modify its fast path, so that IP multicast routing will be disabled on the SMLT VLANs specified in SMLT-PEER-MCAST-HOLD-DOWN-TIMER-START message. For these VLANs, after turning off multicast routing, Layer 2 switching will be enabled. There are two options for Layer 2 forwarding: IP multicast packets from SMLT link between Router B and C can either be sent out via IST link to Router A; or they can also be broadcast within SMLT VLAN. In the latter case, because IST link is a member of SMLT VLAN, multicast packets will also be sent to SMLT peer (Router A in the example) via IST.

The modification in Router B only impacts multicast data packets. For all the control packets, including all unicast and multicast control protocol packets, such as PIM (S, G) JOIN packets, will be allowed to send to router B's control plane, so that both unicast and multicast protocols will convergence normally. Because of this, when IP multicast hold-down timer expires, both unicast and multicast routes will be available on router B.

The SMLT link between Router B and C will now be open. Once router C detects the link to router B is up, router C's MLT hashing algorithm will switch traffic outgoing interface from the link to Router A to the SMLT link towards Router B. Since Router B already enables Layer 2 forwarding on its fastpath, IP multicast packets will be Layer 2 forwarded to Router A via IST link. Router A then routed them to their destination.

Figure 7:
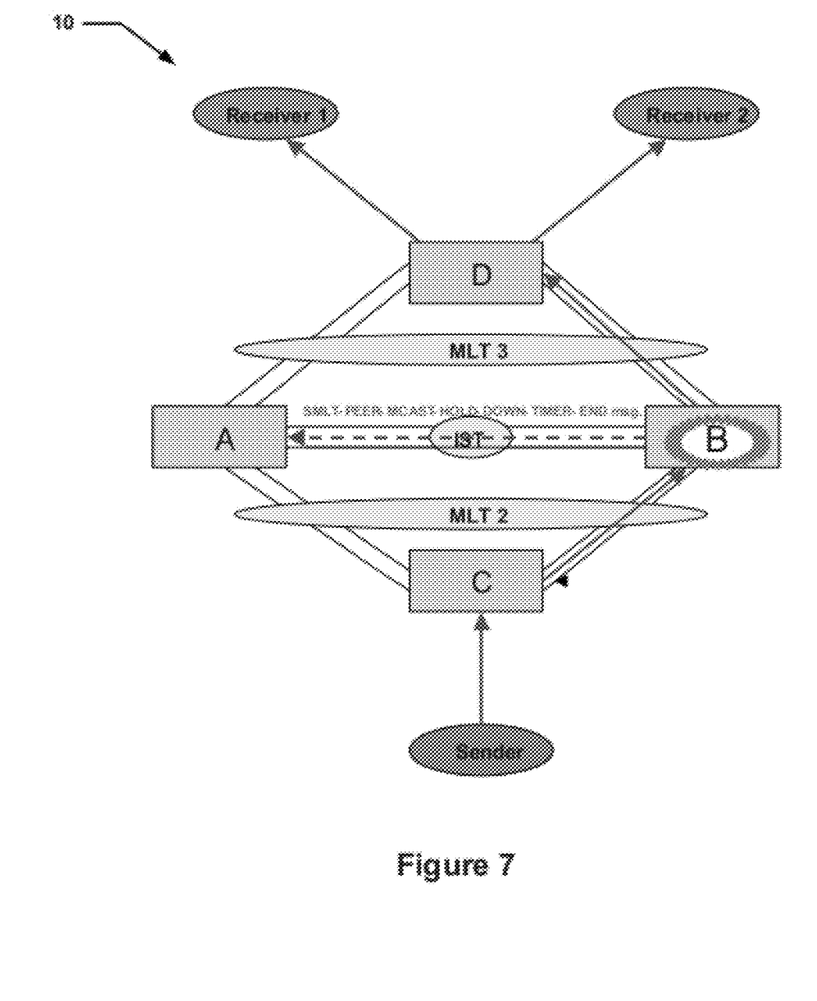
FIG. 7 shows an SMLT environment in accordance wherein Router B sends a timer end message to its peer.
Figure 8:
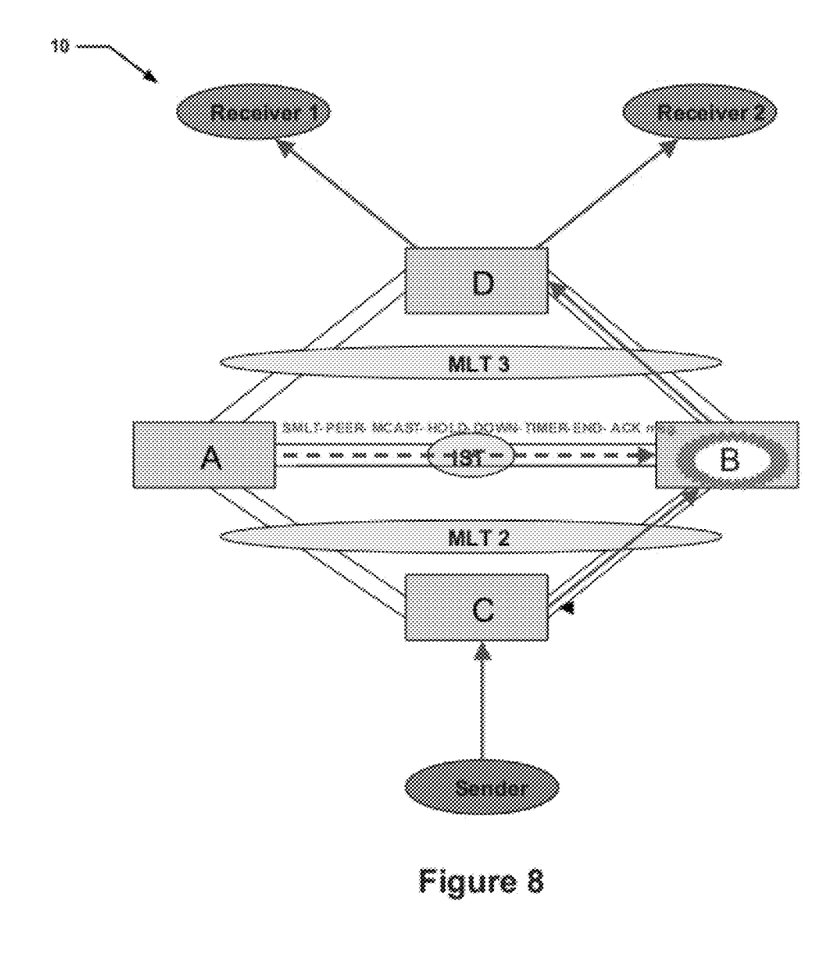
FIG. 8 shows the SMLT environment of FIG. 7 wherein Router B has received an acknowledgement for the timer end message from its SMLT peer.

When IP multicast hold-down timer expires on Router B, it will modify its fast path back to normal, meaning it will turn off Layer 2 forwarding and enable IP multicast on the VLAN interfaces that it had disabled earlier. At this moment all the multicast routes should be available and programmed properly on fastpath. Hence router B should be able to forward multicast packets by itself now. Once Router B finishes this, it will send a SMLT-PEER-MCAST-HOLD-DOWN-TIMER-END message to its SMLT peer (Router A), as shown In FIG. 7. Upon receiving SMLT-PEER-MCAST-HOLD-DOWN-TIMER-END message, router A will reprogram all the (S, G, M') records, that it had modified earlier, back to normal. When router A finishes this, it will send SMLT-PEER-MCAST-HOLD-DOWN-TIMER-END-ACK message back to Router B, so that Router B knows the whole IP multicast hold-down operation completes. FIG. 8 shows this step. If for any reasons the above messages between SMLT peers got lost, the senders will resend the message after failing to receive the ACK message. While the IP multicast hold-down timer invention is illustrated with triangle SMLT connection, it should be appreciated that this technique applies to other type of SMLT configuration, such as full mesh, as well.

Figure 9A:
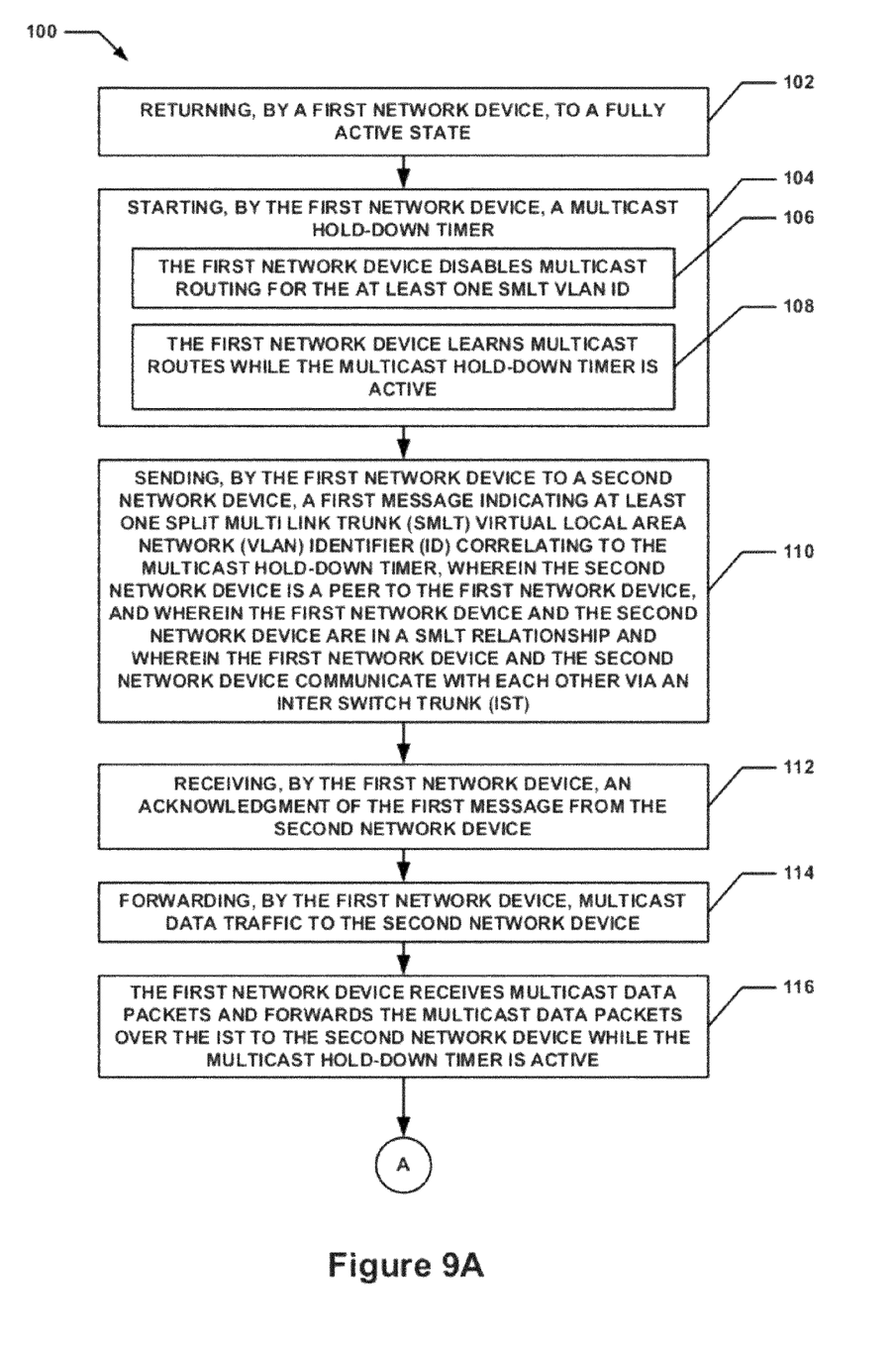
FIGS. 9A and 9B depict a flow diagram of a first particular embodiment of a method for performing IP multicast traffic failover and recovery in accordance with embodiments of the invention.
Figure 9B:
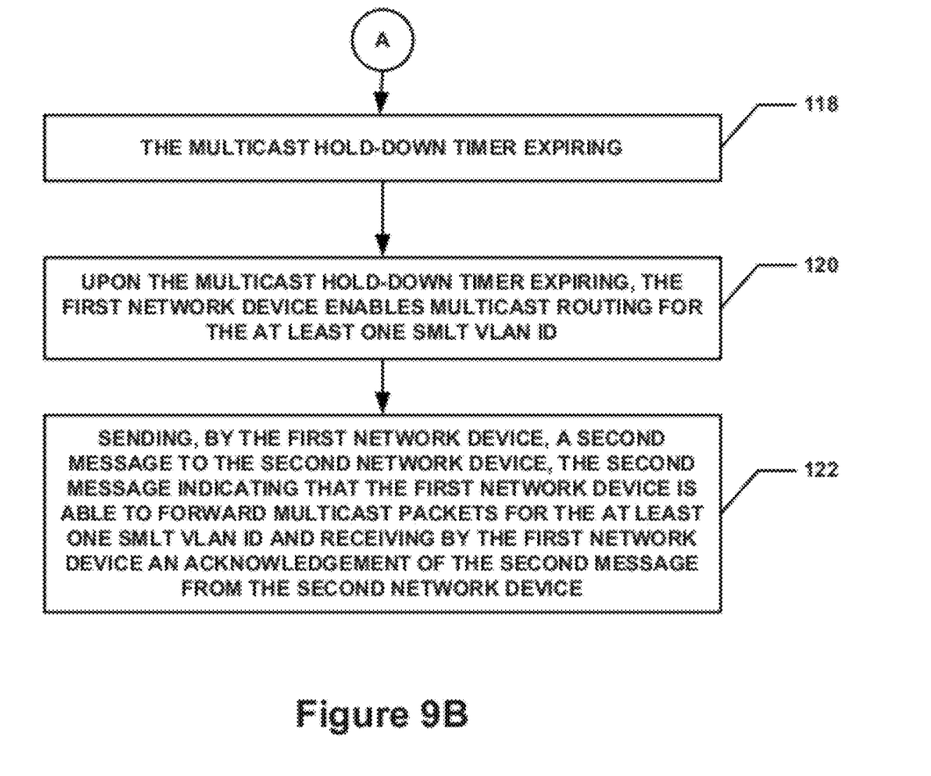
Figure 10:
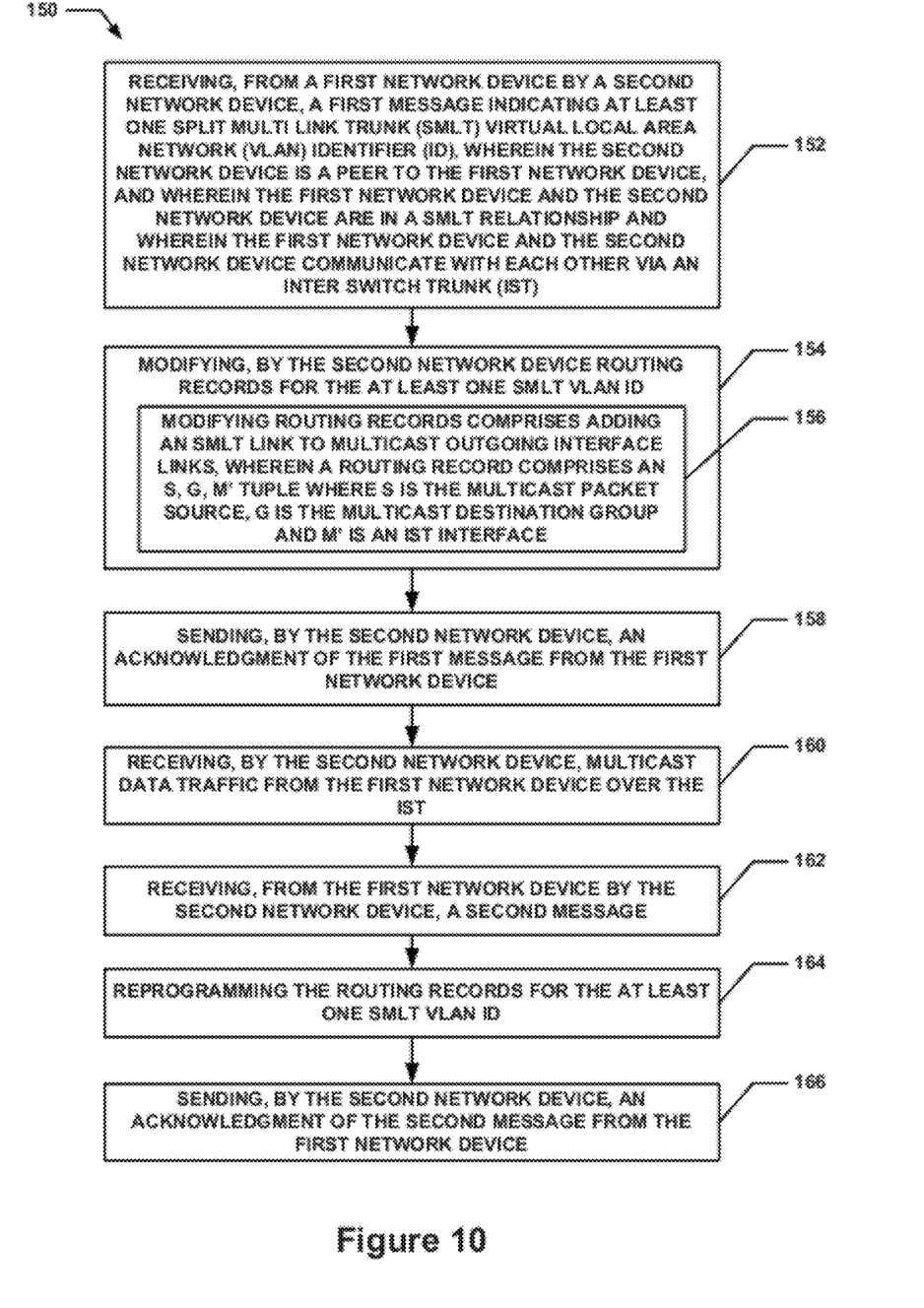
FIG. 10 depicts a flow diagram of a second particular embodiment of a method for performing IP multicast traffic failover and recovery in accordance with embodiments of the invention.

Flow diagrams of particular embodiments of the presently disclosed methods are depicted in FIGS. 9A, 9B and 10. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 9A and 9B a first particular embodiment of a method for performing multicast traffic failover and recovery 100 is shown. Method 100 starts with processing block 102 which discloses returning, by a first network device, to a fully active state from a previous crash. In this instance the first network device is in an UP state and it's physical interfaces are open, however, the first network device's protocols may not yet be in a fully convergent state. The first network device, for example, is router B in FIGS. 1-8.

Processing block 104 states starting, by the first network device, a multicast hold-down timer. As shown in processing block 106 first network device disables multicast routing for the at least one SMLT VLAN ID. As further shown in processing block 108 the first network device learns multicast routes while the multicast hold-down timer is active. There is no multicast traffic hitting router B from SMLT link before IP multicast hold-down timer starts. As a result there is no traffic loss before IP multicast hold-down timer fires up. The duration for the IP multicast hold-down timer can be pre-configured. It can also be turned off dynamically based on router B's multicast routing readiness.

Processing block 110 recites sending, by the first network device to a second network device, a first message indicating at least one Split Multi Link Trunk (SMLT) Virtual Local Area Network (VLAN) Identifier (ID) correlating to the multicast hold-down timer, wherein the second network device is a peer to the first network device, and wherein the first network device and the second network device are in a SMLT relationship and wherein the first network device and the second network device communicate with each other via an Inter Switch Trunk (IST). Once the first network device starts its IP multicast hold-down timer, it sends an SMLT-PEER-MCAST-HOLD-DOWN-TIMER-START message to its SMLT peer (second network device in this example) via IST link. This message contains SMLT VLAN IDs, on which SMLT multicast hold-down timer will be turned on. These VLANs can be configured by user. By default, multicast hold-down timer will be enabled on all SMLT VLANs.

Processing block 112 discloses receiving, by the first network device, an acknowledgment of the first message from the second network device. After modifying its IP multicast routing records, the second network device sends back a SMLT-PEER-MCAST-HOLD-DOWN-TIMER-START-ACK message back to the first network device.

Processing block 114 states forwarding, by the first network device, multicast data traffic to the second network device. Upon receiving this ACK message, the first network device will modify its fast path, so that IP multicast routing will be disabled on the SMLT VLANs specified in SMLT-PEER-MCAST-HOLD-DOWN-TIMER-START message. For these VLANs, after turning off multicast routing, Layer 2 switching will be enabled. There are two options for Layer 2 forwarding: IP multicast packets from SMLT link between the first network device and another device can either be sent out via IST link to the second network device; or they can also be broadcast within SMLT VLAN. In the latter case, because IST link is a member of SMLT VLAN, multicast packets will also be sent to SMLT peer (the second network device in the example) via IST.

Processing block 116 recites the first network device receives multicast data packets and forwards the multicast data packets over the IST to the second network device while the multicast hold-down timer is active.

Processing continues with processing block 118 which discloses the multicast hold-down timer expiring. The modification in the first network device only impacts multicast data packets. For all the control packets, including all unicast and multicast control protocol packets, such as PIM (S, G) JOIN packets, will be allowed to send to the first network device's control plane, so that both unicast and multicast protocols will convergence normally. Because of this, when IP multicast hold-down timer expires, both unicast and multicast routes will be available on the first network device.

Processing block 120 states upon the multicast hold-down timer expiring, the first network device enables multicast routing for the at least one SMLT VLAN ID. When IP multicast hold-down timer expires on the first network device, it will modify its fast path back to normal, meaning it will turn off Layer 2 forwarding and enable IP multicast on the VLAN interfaces that it had disabled earlier. At this moment all the multicast routes should be available and programmed properly on fastpath. Hence the first network device should be able to forward multicast packets by itself now.

Processing block 122 recites sending, by the first network device, a second message to the second network device, the second message indicating that the first network device is able to forward multicast packets for the at least one SMLT VLAN ID and receiving by the first network device an acknowledgement of the second message from the second network device. Upon receiving SMLT-PEER-MCAST-HOLD-DOWN-TIMER-END message, the second network device will reprogram all the (S, G, M') records, that it had modified earlier, back to normal. When the second network device finishes this, it will send SMLT-PEER-MCAST-HOLD-DOWN-TIMER-END-ACK message back to the first network device, so that the first network device knows the whole IP multicast hold-down operation completes.

Referring now to FIG. 10, a second particular embodiment of a method for performing multicast traffic failover and recovery 150 is shown. Method 150 begins with processing block 152 which discloses receiving, from a first network device by a second network device, a first message indicating at least one Split Multi Link Trunk (SMLT) Virtual Local Area Network (VLAN) Identifier (ID), on which SMLT MULTICAST HOLD DOWN timer will start, wherein the second network device is a peer to the first network device, and wherein the first network device and the second network device are in a SMLT relationship and wherein the first network device and the second network device communicate with each other via an Inter Switch Trunk (IST). Once the first network device starts its IP multicast hold-down timer, it sends an SMLT-PEER-MCAST-HOLD-DOWN-TIMER-START message to its SMLT peer (the second network device in the example) via IST link. This message contains SMLT VLAN IDs, on which SMLT multicast hold-down timer will be turned on. These VLANs can be configured by user. By default, multicast hold-down timer will be enabled on all SMLT VLANs.

Processing block 154 states modifying, by the second network device routing records for the at least one SMLT VLAN ID. As shown in processing block 156, modifying routing records comprises adding an SMLT link towards multicast packets' destination to multicast outgoing interface links, wherein a routing record comprises an S, G, M' tuple where S is the multicast packet source, G is the multicast destination group and M' is an IST interface.

IP multicast routes are specified as (S, G, M) tuple, where S and G mean multicast source and destination group respectively, and M indicates multicast packet's incoming interface. In SMLT environment, each multicast route that has SMLT link as incoming interface also has a corresponding routing record (S, G, M'). Here M' indicates the IST interface. The (S, G, M') routing records are used to handle the multicast packets coming from IST link. Under normal condition, for the (S, G, M') routing record, SMLT link between the second network device and destination device will be excluded from multicast outgoing interface list to avoid duplicate multicast packets sent to receivers. That interface is only added to multicast outgoing interface list when SMLT link between the first network device and the source device is down. With this proposed solution, upon receiving the SMLT-PEER-MCAST-HOLD-DOWN-TIMER-START message from the first network device, the second network device will modify its IP multicast routes, so that for all the (S, G, M') routing records, SMLT link between the second network device and the destination device will be added to multicast outgoing interface list. Here M' is the IST interfaces on the second network device for each SMLT VLAN specified in SMLT-PEER-MCAST-HOLD-DOWN-TIMER-START message. This will enable the second network device to forward the IP multicast traffic from the first network device to their destination.

Processing block 158 recites sending, by the second network device, an acknowledgment of the first message from the first network device. After modifying its IP multicast routing records, the second network device sends back a SMLT-PEER-MCAST-HOLD-DOWN-TIMER-START-ACK message back to the first network device.

Processing block 160 discloses receiving, by the second network device, multicast data traffic from the first network device over the IST. Since the first network device already enables Layer 2 forwarding on its fastpath, IP multicast packets will be Layer 2 forwarded to the second network device via IST link. The second network device then routed them to their destination.

Processing block 162 states receiving, from the first network device by the second network device, a second message. Processing block 164 recites reprogramming the routing records for the at least one SMLT VLAN ID. Upon receiving SMLT-PEER-MCAST-HOLD-DOWN-TIMER-END message, the second network device will reprogram all the (S, G, M') records, that it had modified earlier, back to normal.

Processing block 166 discloses sending, by the second network device, an acknowledgment of the second message from the first network device. When the second network device finishes this, it will send SMLT-PEER-MCAST-HOLD-DOWN-TIMER-END-ACK message back to the first network device, so that the first network device knows the whole IP multicast hold-down operation completes.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method in which a network device performs operations comprising:
   returning, by a first network device, to a fully active state;
   starting, by said first network device, a multicast hold-down timer;
   sending, by said first network device to a second network device, a first message indicating at least one Split Multi Link Trunk (SMLT) Virtual Local Area Network (VLAN) Identifier (ID) correlating to said multicast hold-down timer, wherein said second network device is a peer to said first network device, and wherein said first network device and said second network device are in a SMLT relationship and wherein said first network device and said second network device communicate with each other via an Inter Switch Trunk (IST);
   receiving, by said first network device, an acknowledgment of said first message from said second network device; and
   forwarding, by said first network device, multicast data traffic to said second network device.

2. The method of claim 1 wherein said first network device disables multicast routing for said at least one SMLT VLAN ID.

3. The method of claim 1 wherein said first network device learns multicast routes while said multicast hold-down timer is active.

4. The method of claim 1 wherein said first network device receives multicast data packets and forwards said multicast data packets over said IST to said second network device while said multicast hold-down timer is active.

5. The method of claim 4 further comprising said multicast hold-down timer expiring.

6. The method of claim 5 wherein upon said multicast hold-down timer expiring, said first network device enables multicast routing for said at least one SMLT VLAN ID.

7. The method of claim 6 further comprising sending, by said first network device, a second message to said second network device, said second message indicating that said first network device is able to forward multicast packets for said at least one SMLT VLAN ID and receiving by said first network device an acknowledgement of said second message from said second network device.

8. A method in which a network device performs operations comprising:
   receiving, from a first network device by a second network device, a first message indicating at least one Split Multi Link Trunk (SMLT) Virtual Local Area Network (VLAN) Identifier (ID), wherein said second network device is a peer to said first network device, and wherein said first network device and said second network device are in a SMLT relationship and wherein said first network device and said second network device communicate with each other via an Inter Switch Trunk (IST);
   modifying, by said second network device routing records for said at least one SMLT VLAN ID;
   sending, by said second network device, an acknowledgment of said first message from said first network device; and
   receiving, by said second network device, multicast data traffic from said first network device over said IST.

9. The method of claim 8 further comprising:
   receiving, from the first network device by the second network device, a second message;
   reprogramming said routing records for said at least one SMLT VLAN ID; and
   sending, by said second network device, an acknowledgment of said second message from said first network device.

10. The method of claim 8 wherein said modifying routing records comprises adding an SMLT link towards multicast packets' destination to multicast outgoing interface links, wherein a routing record comprises an S, G, M' tuple where S is the multicast packet source, G is the multicast destination group and M' is an IST interface.

11. A non-transitory computer readable storage medium having computer readable code thereon for performing multicast traffic failover and recovery, the medium including instructions in which a network devices perform operations comprising:
- returning, by a first network device, to a fully active state;
- starting, by said first network device, a multicast hold-down timer;
- sending, by said first network device to a second network device, a first message indicating at least one Split Multi Link Trunk (SMLT) Virtual Local Area Network (VLAN) Identifier (ID) correlating to said multicast hold-down timer, wherein said second network device is a peer to said first network device, and wherein said first network device and said second network device are in a SMLT relationship and wherein said first network device and said second network device communicate with each other via an Inter Switch Trunk (IST);
- receiving, by said first network device, an acknowledgment of said first message from said second network device; and
- forwarding, by said first network device, multicast data traffic to said second network device.

12. The computer readable storage medium of claim 11 further including instructions wherein said first network device disables multicast routing for said at least one SMLT VLAN ID.

13. The computer readable storage medium of claim 11 further including instructions wherein said first network device learns multicast routes while said multicast hold-down timer is active.

14. The computer readable storage medium of claim 11 further including instructions wherein said first network device receives multicast data packets and forwards said multicast data packets over said IST to said second network device while said multicast hold-down timer is active.

15. The computer readable storage medium of claim 14 further comprising instructions wherein said multicast hold-down timer expires.

16. The computer readable storage medium of claim 15 further including instructions wherein upon said multicast hold-down timer expiring, said first network device enables multicast routing for said at least one SMLT VLAN ID.

17. The computer readable storage medium of claim 16 further comprising instructions for sending, by said first network device, a second message to said second network device, said second message indicating that said first network device is able to forward multicast packets for said at least one SMLT VLAN ID and receiving by said first network device an acknowledgement of said second message from said second network device.

18. A non-transitory computer readable storage medium having computer readable code thereon for performing multicast traffic failover and recovery, the medium including instructions in which a network devices perform operations comprising:
- receiving, from a first network device by a second network device, a first message indicating at least one Split Multi Link Trunk (SMLT) Virtual Local Area Network (VLAN) Identifier (ID), wherein said second network device is a peer to said first network device, and wherein said first network device and said second network device are in a SMLT relationship and wherein said first network device and said second network device communicate with each other via an Inter Switch Trunk (IST);
- modifying, by said second network device routing records for said at least one SMLT VLAN ID;
- sending, by said second network device, an acknowledgment of said first message from said first network device; and
- receiving, by said second network device, multicast data traffic from said first network device over said IST.

19. The computer readable storage medium of claim 18 further comprising instructions for:
- receiving, from the first network device by the second network device, a second message;
- reprogramming said routing records for said at least one SMLT VLAN ID; and
- sending, by said second network device, an acknowledgment of said second message from said first network device.

20. The computer readable storage medium of claim 18 further including instructions wherein said modifying routing records comprises adding an SMLT link towards multicast packets' destination to multicast outgoing interface links, wherein a routing record comprises an S, G, M' tuple where S is the multicast packet source, G is the multicast destination group and M' is an IST interface.

* * * * *